United States Patent [19]

Goepel

[11] Patent Number: 4,554,450
[45] Date of Patent: Nov. 19, 1985

[54] DEVICE FOR ANGLE OF ROTATION DETERMINATION

[75] Inventor: Ernst Goepel, Germering, Fed. Rep. of Germany

[73] Assignee: Siemens Aktiengesellschaft, Berlin & Munich, Fed. Rep. of Germany

[21] Appl. No.: 452,624

[22] Filed: Dec. 23, 1982

[30] Foreign Application Priority Data

Jan. 15, 1982 [DE] Fed. Rep. of Germany ....... 3201163

[51] Int. Cl.$^4$ .............................................. G01D 5/34
[52] U.S. Cl. .......................... 250/231 SE; 340/347 P; 356/395
[58] Field of Search ..................... 250/231 SE, 237 G; 356/395; 340/347 P

[56] References Cited

U.S. PATENT DOCUMENTS 2,944,157 7/1960 McAuslan et al. ........... 250/231 SE
4,247,769 1/1981 Warner ......................... 250/231 SE
4,466,189 8/1984 Tobin .................................. 33/267

Primary Examiner—John K. Corbin
Assistant Examiner—R. Eyssallenne
Attorney, Agent, or Firm—Hill, Van Santen, Steadman & Simpson

[57] ABSTRACT

In a device for determining the angle of rotation of a rotating member by use of a perforated disk which corotates with the rotating member and intermittently interrupts a continuous beam of light directed at the perforations of the disk, an improvement comprises providing perforations of the disk which define light permeable and light impermeable areas such that a width of the light permeable areas is less than a width of the light impermeable areas, and a width of the light permeable areas is approximately the same as a width of an aperture at a light receiving station. A symmetrical output signal is obtainable so as to increase a resolution of the angle of rotation measurement.

5 Claims, 4 Drawing Figures

DEVICE FOR ANGLE OF ROTATION DETERMINATION

BACKGROUND OF THE INVENTION

1. Field of the Invention

This invention relates to a device for optically determining the angle of rotation of a rotating member.

2. The Prior Art

Applications are known where it is desirable to determine the angle of rotation of a rotating member. For example, in printing devices with moving print heads, the position of the print head along the width of the paper may be set or determined by measuring the angle of rotation of the driving shaft of an electric motor. In the past, this has been accomplished by the employment of a transmission light sensor comprising a light emitter and a light receiver between which is disposed a perforated disk corotatable with the shaft of the rotating element. When the perforated disk is placed in rotation, the constant light stream emitted by the light emitter is periodically interrupted. These interruptions are evaluated at the light receiver and, under certain conditions, are supplied to a signal converter. The signals thus obtained provide a means for measuring the angle of rotation, as well as the speed, of the rotating element.

Structural constraints have imposed limits on the resolution of such prior art devices. For example, the diameter of the perforated disk cannot be made arbitrarily large. Furthermore, the aperture width of the light receiver may not be made too small. These structural constraints as well as the desire for maximum resolution of the angle of rotation measurement necessitate that the width of the light permeable and of the light impermeable areas of the perforated disk must be significantly larger than the aperture width. As a result, a limit is placed on the fineness of the perforated disk division which, especially with small diameter perforated disks, allows only a coarse resolution of the angle of rotation.

One approach to increasing the resolution of such prior art devices is to increase the diameter of the perforated disk. However, it is often the case that the diameter cannot be made as large as is necessary. Another approach is to increase the number of perforation divisions; but as the width of the light permeable areas of the perforated disk approach the width of the light receiving aperture, the shape of the output signal becomes asymmetrical, thus effecting an increasing error in the rotation angle measurement. This result is particularly disadvantageous when the rotating element is the shaft of a DC motor used in printing or writing devices for driving a carriage, since every deviation from the prescribed angle of rotation will appear as a position error of the carriage.

SUMMARY OF THE INVENTION

The present invention is directed to providing improved measurement precision and resolution in the determination of the angle of rotation of rotating elements. This task is achieved simply and economically without the need for additional, specialized equipment.

According to the invention, the circumferential portion of a perforated rotating disk is disposed between a continuous source of light and a light receiver having an aperture. The disk perforations define light permeable and light impermeable areas of different widths. The width of the light permeable areas is comparable to the aperture width, and the light impermeable areas are wider than the light permeable areas by an amount also comparable to the aperture width. As the permeable and impermeable areas pass through and interrupt the light beam, an output signal is produced having on and off periods of substantially equal duration. Both the on and off periods of the output signal may be used for determining the angle of rotation, thereby doubling the resolution obtained in comparision with the prior art. When used in a printing or writing device, particularly a bi-directional printer, the invention enables a 50% reduction in print position error.

DESCRIPTION OF THE PREFERRED EMBODIMENT

Figure 1:
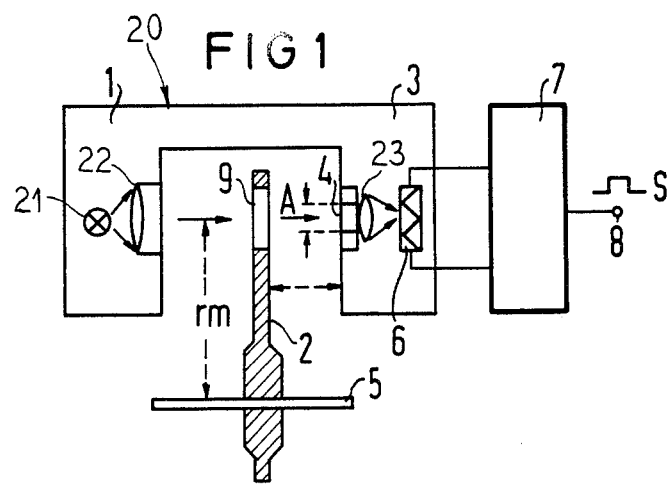
FIG. 1 is a diagrammatic side elevational view of a device for determining the angle of rotation of a rotating element, with parts in vertical section, embodying the principles of the invention.

By way of example of a preferred embodiment of the invention, there is shown in FIG. 1 a device for determining the angle of rotation of a rotating member which, for purposes of illustration, is a shaft 5 of an electric motor. A stationary transmission light sensor having an emitter portion 1 and a receiving portion 3 spaced therefrom. The emitter portion 1 has a light source 21 and lens 22 directing a beam of light toward the receiver portion 3 across the gap formed therebetween. At the receiver portion 3, the light passes through aperture 4 having width A, and lens 23, thereafter impinging on photoelectric sensor 6. A signal converter 7 connected to the photoelectric sensor 6 emits an output signal S at its output 8. A sensing plane is defined by a perforated disk 2 having effective diameter rm. The circumferential annular portion of the disk 2 is disposed between the light emitter 1 and the light receiver 3. The perforated disk 2 is secured to the shaft 5 at its center. Substantially rectangular, radially disposed perforations 9 are formed at regular intervals near the outer circumference of the disk and are disposed so that they lie in the beam path of the focused light beam transmitted from the light emitter 1 to the light receiver 3.

Figure 2:
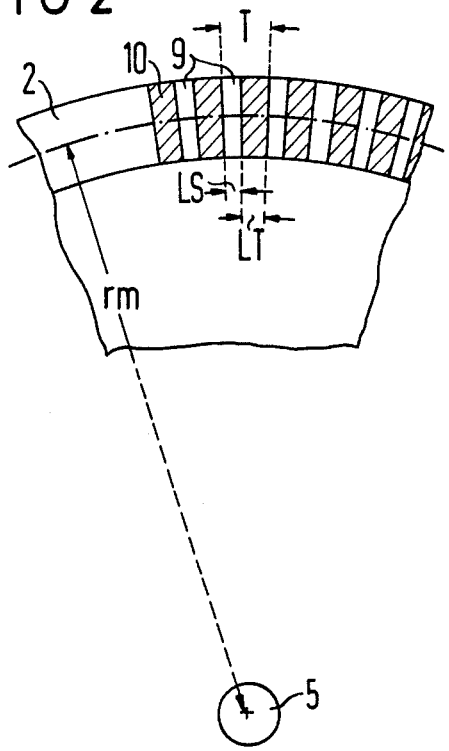
FIG. 2 is a diagrammatic fragmentary end view of the perforated disk used in FIG. 1.

The structure of the perforated disk 2 may be seen in more detail in FIG. 2. Light permeable areas are defined by perforations 9 which alternate with light impermeable areas 10. According to the invention, the width LS of the light permeable areas is less than the width LT of the light impermeable areas. The divisional width T is equal to the sum of the widths LS and LT.

Figure 3:
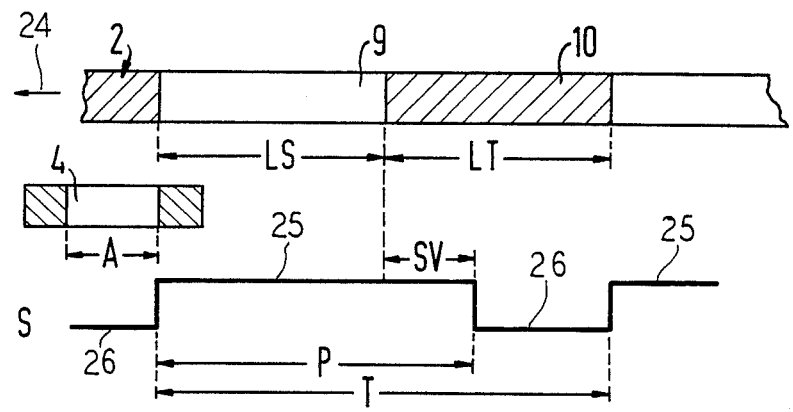
FIG. 3 is a diagrammatic fragmentary sectional edge view of a device according to the prior art and showing the output signal derived therefrom.

The operation of the device according to the invention may be undertood by first referring to a device according to prior art. Such a device is shown in FIG. 3, wherein the width LS of a light permeable perforation 9 and the width LT of a light impermeable area 10 are equal and comparable in magnitude to the width A of the aperture 4. As the disk 2 rotates in the direction indicated by arrow 24, the leading edge of the perforation 9 comes into alignment with the near edge of the aperture 4, thus beginning an on portion 25 of the output signal S. The on portion 25 of the signal continues until the trailing edge of the perforation 9 moves past the far edge of the aperture 4 and light is no longer transmitted through the openings. During the period that no light passes through the openings, an off portion 26 of the signal is generated.

The pulse width P of the output signal S is, therefore, determined by the aperture width A and by the width LS of the light permeable area 9. The output signal S thus produced is asymmetrical, i.e., the pulse duty factor Q, which is defined by P/T is significantly larger than 0.5. A specific offset SV thereby occurs which is determined by the influence of the aperture width A as well as by optical errors of the transmission light sensor 20. Since the on portion of the signal 25 is significantly longer in duration than the off portion of the signal 26, special means must be employed if both the on and off portions are to be used in determining the angle of rotation.

Figure 4:
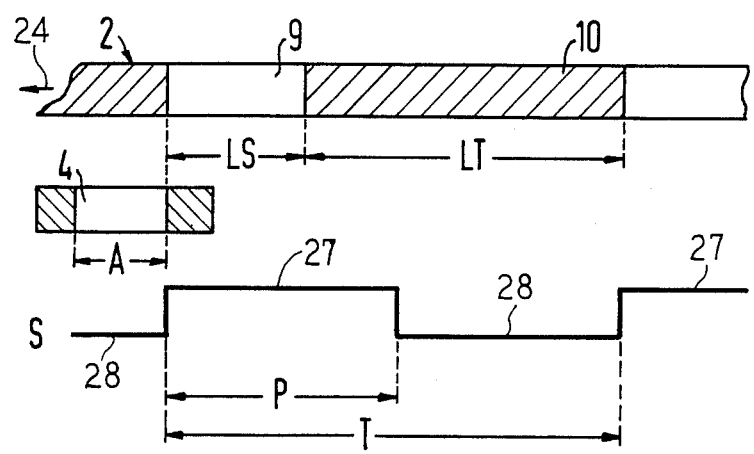
FIG. 4 is a fragmentary edge sectional view of a device according to the invention and showing the output signal derived therefrom.

The operation of the device according to the invention is shown in FIG. 4. The width LS of the light permeable area 9 is less than the width LT of the light impermeable area 10. As the perforated disk 2 moves past the aperture 4 in the direction indicated by arrow 24, an output signal S is generated which, when the difference between the widths LT and LS is set equal to the aperture width A, has on portions 27 and off portions 28 of equal duration. The resultant symmetrical output signal S has a pulse duty factor Q equal to 0.5. Since the on and off signal portions 27 and 28 are of equal duration, they may be used in the same manner for determining the angle of rotation. This allows an effective doubling of the resolution of the angle measurement without the requirement of an alteration of the structural format of the device. The invention may be practiced with commercially available forklight barriers.

Although various minor modifications may be suggested by those versed in the art, it should be understood that I wish to embody within the scope of the patent warranted hereon all such modifications as reasonably and properly come within the scope of my contribution to the art.

I claim as my invention:

1. A light beam interrupting system for use in a device for determining an angle of rotation of a rotating member, comprising:
    means for emitting a continuous beam of light:
    means for receiving said beam of light having a light accepting aperture; and
    light interrupting means, moving in conjunction with said rotating member, disposed in a plane perpendicular to said beam of light and between said means for receiving and means for emitting and having a plurality of regularly spaced light transmitting areas disposed in the path of said beam of light and which define light permeable areas and light impermeable areas, a width of said light permeable areas being less than a width of said light impermeable areas, and the width of said light permeable areas being at least substantially the same or slightly larger than a width of said light accepting aperture in a running direction of the light interrupting means.

2. The system according to claim 1, wherein the difference between the width of said light impermeable area and the width of said light permeable area is substantially equal to a width of said aperture.

3. The system according to claim 1, further comprising means comprising a photocell circuit operatively associated with said means for receiving for forming a pulse dependent on the interruption of said beam, said signal having on periods and off periods of substantially equal duration.

4. The system according to claim 1, wherein said light interrupting means comprises a disk which corotates with said rotating member, and said light transmitting areas are radially disposed at a circumference of said disk.

5. In a device for determining an angle of rotation of a rotating member and having means for emitting a continuous beam of light, means for receiving said beam of light having a light accepting aperture, and a light interrupting means disposed between said means for emitting and said means for receiving and having a plurality of regularly spaced light transmitting areas disposed in a path of said beam defining light permeable and light impermeable areas, the improvement comprising:
    a width of said light impermeable areas being less than a width of said light permeable areas by an amount substantially equal to a width of said aperture.

* * * * *